(12) United States Patent
Wyatt

(10) Patent No.: US 8,102,452 B1
(45) Date of Patent: Jan. 24, 2012

(54) ELECTRON IMAGING PIXEL LEAKAGE REDUCTION

(75) Inventor: Michael A. Wyatt, Clearwater, FL (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 680 days.

(21) Appl. No.: 12/275,403

(22) Filed: Nov. 21, 2008

(51) Int. Cl.
*H04N 5/335* (2011.01)
(52) U.S. Cl. ........................................ 348/308
(58) Field of Classification Search ............ 348/308, 348/294, 257
See application file for complete search history.

(56) References Cited

U.S. PATENT DOCUMENTS 7,655,966 B2 * 2/2010 Adkisson et al. ............ 257/292

\* cited by examiner

*Primary Examiner* — Hung Dang
(74) *Attorney, Agent, or Firm* — RatnerPrestia

(57) ABSTRACT

A pixel accumulates charge and an active guard ring surrounds the pixel. A buffer has an input terminal coupled to the pixel and an output terminal coupled to the active guard ring. The buffer places a charge potential on the active guard ring that is substantially equal to a charge potential on the pixel. The charge leakage from the pixel is effectively reduced.

14 Claims, 6 Drawing Sheets

ELECTRON IMAGING PIXEL LEAKAGE REDUCTION

FIELD OF THE INVENTION

This invention relates, generally, to reducing electron leakage in an imaging circuit. More specifically, the invention relates to an active guard ring surrounding each pixel. The active guard ring is set at a potential voltage to reduce the differential voltage between the pixel and the active guard ring.

BACKGROUND OF THE INVENTION

During imaging chip design, a thin top metal or conducting layer guard ring surrounding the pixel perimeter is included. The purpose of this ring is to act as a barrier to charges leaking to or from the pixel. Conventionally, this ring is tied to a fixed voltage or ground potential and, therefore, pixel leakage current normally flows to or from this ring and not to the adjacent pixels in the circuit. The leakage current is proportional to the pixel to ring voltage difference and inversely proportional to the equivalent leakage resistance. One conventional technique to reduce surface leakage current to acceptable limits is to increase the surface leakage resistance. This increase often requires super cleaning the surface of the image chip. To further reduce the surface leakage current, post processing of the image chip is utilized to form a lengthy path for possible leakage charges, thereby causing an increase in effective surface leakage resistance, often at the expense of chip yield and cost.

As will be explained, the present invention provides an active guard ring that acts as a barrier to reduce or eliminate charge leakage between pixels. By controlling the potential of the active guard ring to be near the potential of the pixel, it is possible to reduce or eliminate leakage current.

SUMMARY OF THE INVENTION

To meet this and other needs, and in view of its purposes, the present invention provides a pixel leakage reduction circuit including a pixel for accumulating charge; an active guard ring surrounding the pixel; and a buffer having an input terminal coupled to the pixel and an output terminal coupled to the active guard ring. The buffer places a charge potential on the active guard ring that is substantially equal to a charge potential on the pixel for effectively reducing charge leakage from the pixel. Also included is a ground guard ring surrounding the active guard ring. The ground guard ring conducts pixel leakage current to a ground node.

In an embodiment of the invention, a differential amplifier is included having a first input terminal coupled to the pixel and a second input terminal coupled to the active guard ring. The second input terminal of the differential amplifier is coupled to an output terminal of the differential amplifier to provide a unity gain buffer.

In another embodiment of the invention, a source follower amplifier is included having an input terminal coupled to the pixel and an output terminal coupled to the active guard ring. The source follower amplifier provides a unity gain buffer.

In another embodiment of the invention, included is an array of pixels, each pixel in the array surrounded by an active guard ring, and each pixel and active guard ring being coupled to each other by a buffer. Each buffer places a charge potential on the active guard ring that is substantially equal to the charge potential on the pixel.

Also included is a ground guard ring configured in a grid pattern isolating each pixel and active guard from each other. The ground guard ring conducts a portion of the charge potential to a ground node. In an embodiment of the present invention, each buffer for each pixel and active guard ring is disposed adjacent to an end side of each pixel, and the buffer includes a ground shield for blocking electrons from impinging on the buffer. In another embodiment of the present invention, the buffer for each pixel and active guard ring is disposed in a layer below the pixel. A ground guard ring surrounds each pixel. The ground guard ring conducts a portion of the pixel charge potential to a ground node.

In an embodiment of the present invention a differential amplifier is included having a first input terminal coupled to each pixel and a second input terminal coupled to the active guard ring, and the second input terminal of the differential amplifier is coupled to an output terminal of the differential amplifier to provide a unity gain buffer. Each pixel in the array is a capacitor.

In another embodiment of the present invention a source follower amplifier is included having an input terminal coupled to each pixel and an output terminal coupled to the active guard ring to provide a unity gain buffer. Each pixel is a capacitor.

Another embodiment of the present invention includes a method of reducing pixel leakage in an array by surrounding a pixel with an active guard ring; coupling a buffer between the pixel and the active guard ring; and transferring a charge potential from the pixel to the active guard ring by way of the buffer. The transferred charge potential is substantially equal to the charge potential on the pixel. Transferring includes dynamically transferring the charge potential between the pixel and the active guard ring, in response to a change in the charge potential on the pixel. Transferring includes transferring the charge potential using a unity gain buffer.

It is understood that the foregoing general description and the following detailed description are exemplary, but are not restrictive, of the invention.

DETAILED DESCRIPTION OF THE INVENTION

In an imager circuit including an array of pixels, the leakage current is generally proportional to the voltage difference between a pixel and its corresponding guard ring. If the guard ring is forced to a voltage equal or nearly equal to the pixel voltage, then the leakage current may be reduced. The present invention, as will be described, forces the voltage of the guard ring to the voltage of the pixel using a buffer having an input terminal connected to the pixel and an output terminal connected to the active guard ring. The buffer forces the pixel voltage upon the guard ring, thereby maintaining nearly a zero differential voltage between the pixel and the guard ring. Since the guard ring voltage changes to maintain a nearly zero differential voltage, the guard ring is referred to herein as an active guard ring. With the active guard ring, chip post processing may be avoided or significantly reduced. Each buffer for each pixel in the imager may be constructed from low current MOS devices and located along the perimeter of the guard ring imposing a small chip area penalty.

The present invention also includes an optional ground guard ring. The ground guard ring is an additional barrier that isolates each of the pixels in the imager. This guard ring provides additional protection against residual leakage not stopped by the active guard ring.

The present invention provides an active guard ring for each pixel and forces the potential of the guard ring to be similar to the potential of a respective pixel. The buffer that couples the pixel and the guard ring is described below in two embodiments. As will be explained, the buffer may have unity gain in order to translate the voltage potential from each pixel to its respective guard ring.

Figure 1:
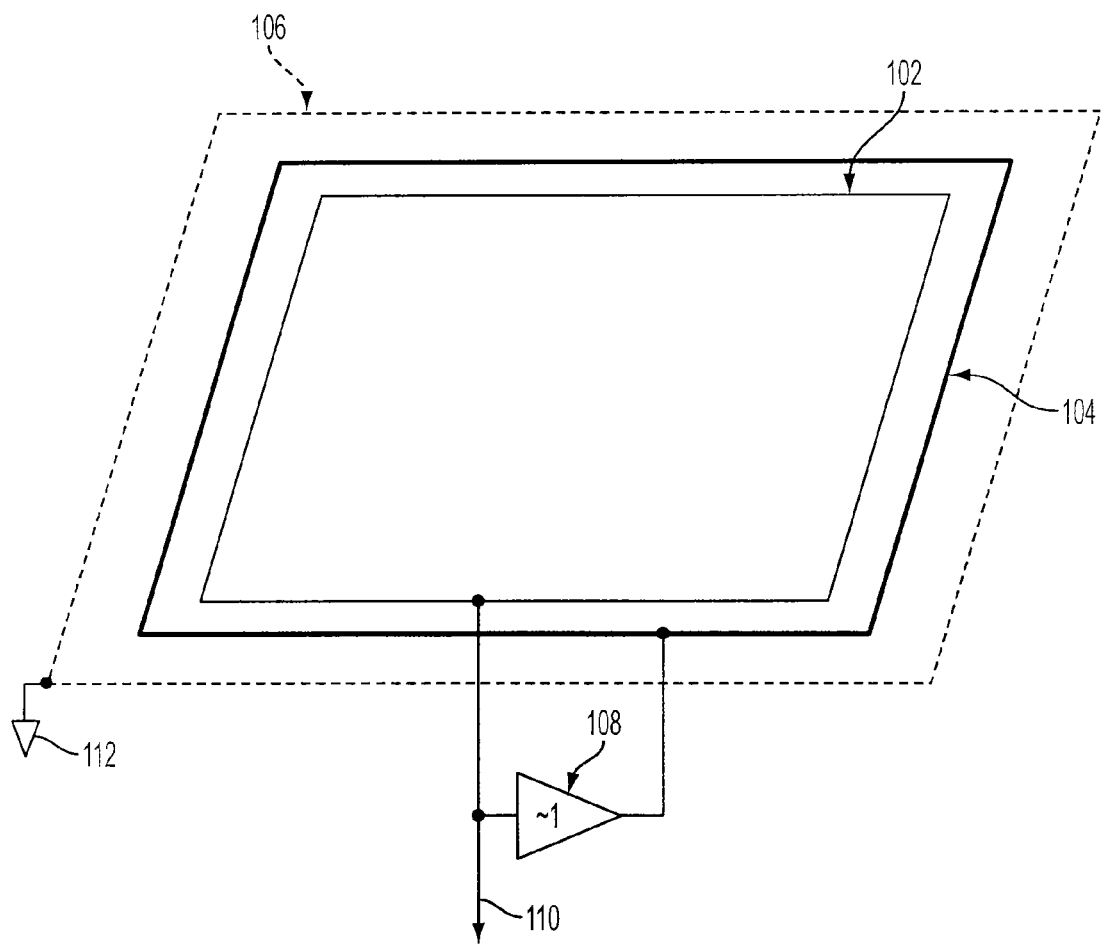
FIG. 1 is a diagram of an electron imaging pixel including a buffer coupling the pixel to an active guard ring, in accordance with an embodiment of the invention.

Referring first to FIG. 1, there is shown pixel 102, active guard ring 104 and optional ground guard ring 106. Ground guard ring 106 is connected to ground node 112. Also, pixel 102 is coupled to active guard ring 104 through buffer 108. Furthermore, node 110 may be connected to a readout circuit of the imager. As shown in FIG. 1, active guard ring 104 completely surrounds pixel 102. Similarly, optional ground guard ring 106 completely surrounds active guard ring 104.

During exposure, charge is accumulated by pixel 102. The accumulated charge potential is transferred via buffer 108 to active guard ring 104. As previously described, by forcing active guard ring 104 to a voltage potential similar to the voltage potential of active pixel 102, leakage current is minimized and possibly eliminated. Each pixel within the imager has an individual active guard ring surrounding it. Each pixel within the imager also has an individual buffer coupling it to its active guard ring. This configuration ensures that each pixel within the array has a uniquely controlled active guard ring.

Another feature shown in FIG. 1 is optional ground guard ring 106. Ground guard ring 106 isolates pixel 102 from other pixels in the imager array. Guard ring 106 is an additional barrier that protects pixel 102 from possible leakage current. For example, pixel 102 and active guard ring 104 are forced to have a similar voltage potential. If the voltage potential difference between the pixel and active guard ring is not zero, there may still be some leakage current. Thus, any residual leakage current that occurs because of a small voltage potential difference is redirected to ground by ground guard ring 106. The leakage current flows through ground guard ring 106 to ground node 112, thereby stopping charge leaking from pixel to pixel within the imager.

Figure 2:
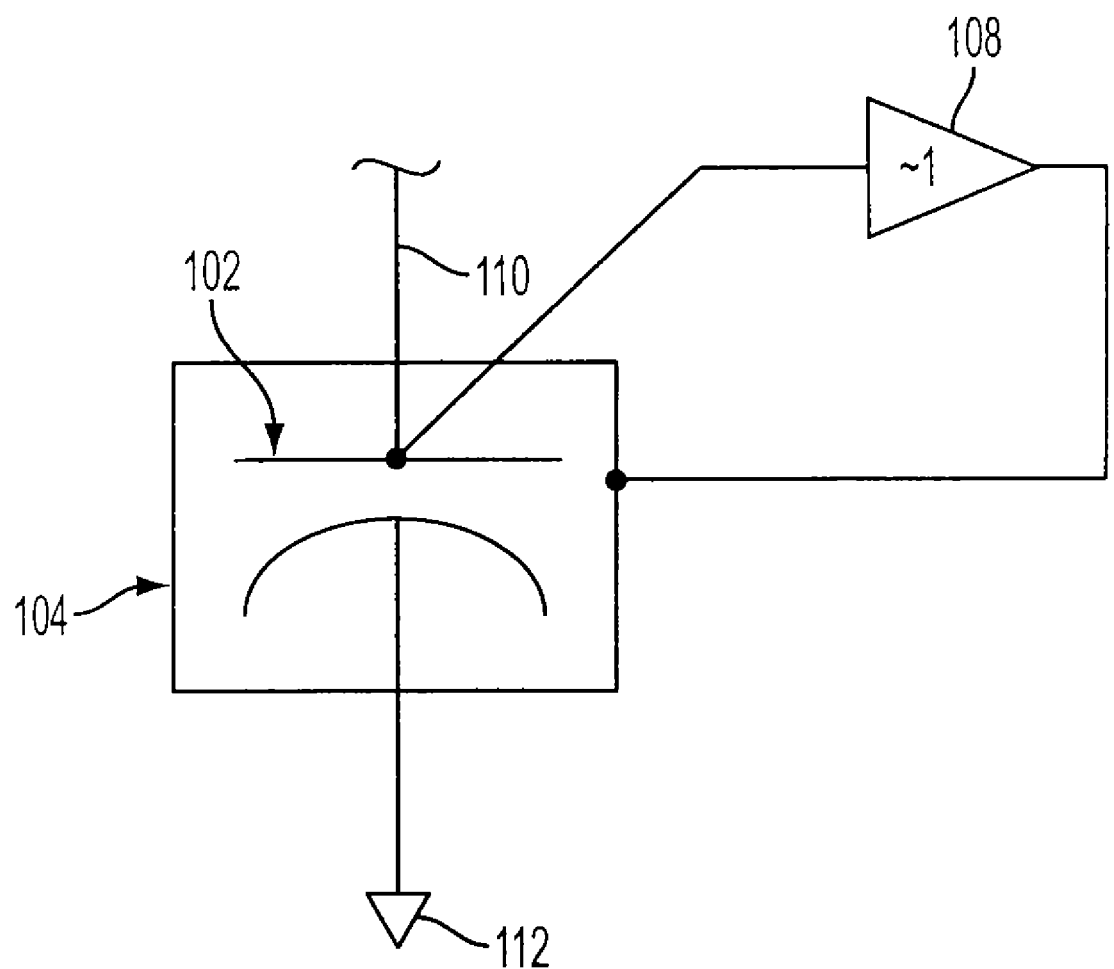
FIG. 2 is a schematic diagram of a pixel represented by a capacitor including a buffer coupling the pixel to the active guard ring, in accordance with an embodiment of the invention.

In an embodiment of the present invention, pixel 102 is an electron imaging pixel. Specifically, the electron imaging pixel is a capacitor that collects impinging electrons. As shown in FIG. 2, the top plate of capacitor 102 is exposed to impinging electrons. As electrons impinge on the pixel, charge accumulates on capacitor 102 and its potential is transferred via buffer 108 to surrounding active guard ring 104.

Buffer 108 may be a unity gain buffer that transfers the potential from the top plate of capacitor 102 to active guard ring 104 without much amplification or attenuation.

Figure 3:
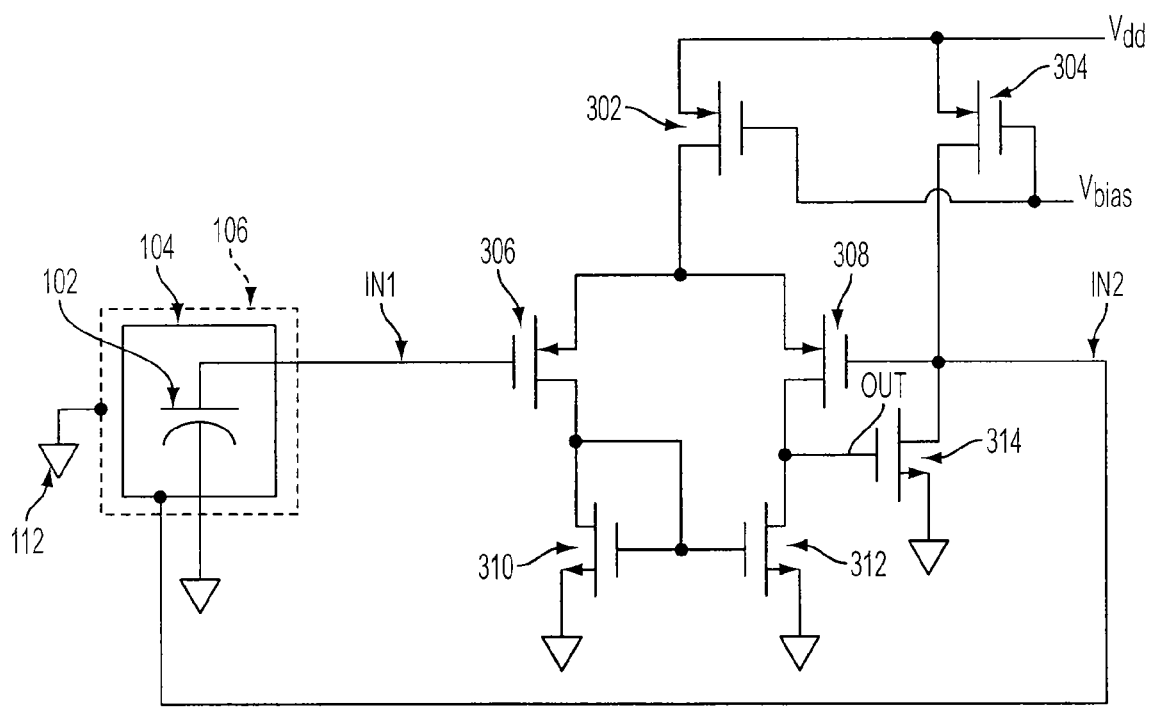
FIG. 3 is a schematic diagram of the buffer shown in FIG. 1 including a differential amplifier connecting the pixel to the active guard ring, in accordance with an embodiment of the invention.

In a first embodiment, unity gain buffer 108 of FIG. 2 may be implemented as a closed loop differential amplifier with biasing transistors as shown in FIG. 3. Specifically, the differential amplifier of buffer 108 includes transistors 306, 308, 310 and 312. Also, buffer 108 includes bias transistors 302, 304 and output transistor 314. In this embodiment, input terminal IN1 of the differential amplifier is coupled to the top plate of capacitor 102 via transistor 306. The output terminal OUT of the differential amplifier is coupled to the active guard ring 104 and to input terminal IN2 of the differential amplifier. Thus, the output terminal of differential amplifier is coupled to one of its input terminals, thereby controlling and minimizing the differential voltage between pixel 102 and active guard ring.

The operation of the differential amplifier shown in FIG. 3 is described below. Charge accumulates as electrons impinge on pixel 102. This accumulated charge produces a potential that is applied to the gate of transistor 306 which is input terminal IN1 of the differential amplifier. The potential on node 316 is thereby equivalent to the potential on terminal IN1 plus the gate to source potential of transistor 306. Thus, the output potential on terminal IN2 is equivalent to the potential on node 316 minus the gate to source voltage of transistor 308. By configuring a differential amplifier as shown in FIG. 3, the output potential on terminal OUT is equivalent to the input potential on terminal IN1. Thus, by connecting terminal OUT to active guard ring 104, the potential differential between active guard ring 104 and pixel 102 is minimized.

Thus, the voltage potentials inputted to transistors 306 and 308 of the differential amplifier produce a voltage differential. This voltage differential alters the potential at terminal IN2 and the active guard ring to which it is coupled. Therefore, the potential residing on the top plate of pixel 102 is translated directly to active guard ring 104 at substantially unity gain.

An advantage in constructing buffer 108 with a differential amplifier, as shown in FIG. 3, is that a precise unity gain may be obtained. Unity gain is important in order to ensure that the voltage potential of pixel 102 is similar to the voltage potential of active guard ring 104. In general, a more precise unity gain produces a smaller voltage differential between the pixel and the active guard ring, resulting in reduced leakage current.

Figure 4:
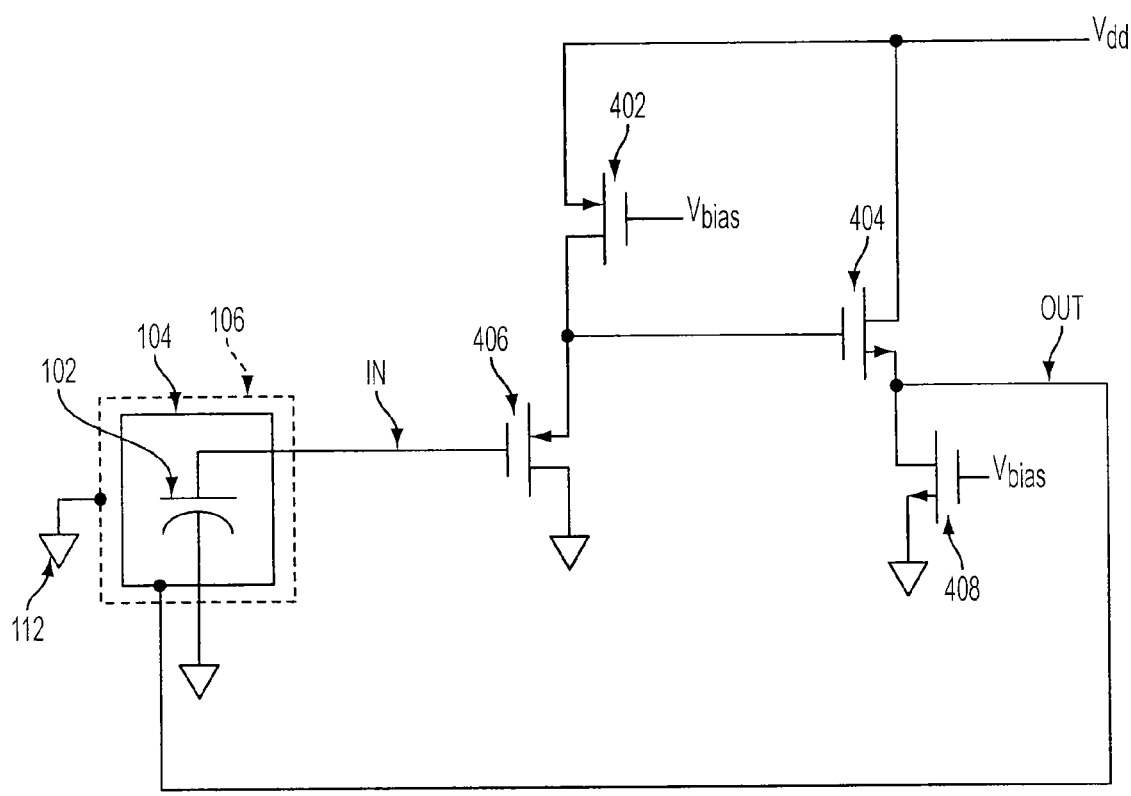
FIG. 4 is a schematic diagram of the buffer shown in FIG. 1 including a cascade source follower coupling the pixel to the active guard ring, in accordance with an embodiment of the invention.

In another embodiment shown in FIG. 4, buffer 108 (FIG. 2) includes a cascade source follower amplifier. Specifically, the cascade source follower includes transistors 406 and 404. The currents that flow through transistors 406 and 404 are further controlled by biasing transistors 402 and 408. In this cascaded source follower, the top plate of pixel 102 is connected to the gate of transistor 406 through terminal IN. As charge builds on pixel 102, the potential applied to the gate of transistor 406 increases. The potential at node 410 is thereby equivalent to the gate potential at node IN plus the gate to source potential of transistor 406. Thus, the output potential on terminal OUT is equivalent to the potential on node 410 minus the gate to source voltage of transistor 404. By configuring a cascade source follower amplifier as shown in FIG. 4, the output potential on terminal OUT is equivalent to the input potential on terminal IN. Thus, by connecting terminal OUT to active guard ring 104, the potential on active guard ring 104 is controlled to be substantially equivalent to the potential on pixel 102.

The cascade source follower, as shown in FIG. 4, has an advantage of minimizing the required number of transistors.

Furthermore, the cascade source follower includes an open loop system which has a fast response time. Response time is important due to the voltage potential on pixel 102 changing, and therefore, the voltage potential of guard ring 104 also changes to follow the voltage potential of the pixel. If the voltage potential of pixel 102 is not quickly transferred to guard ring 104, a voltage potential difference may exist for a period of time. During this time period, leakage current may occur.

Figure 5:
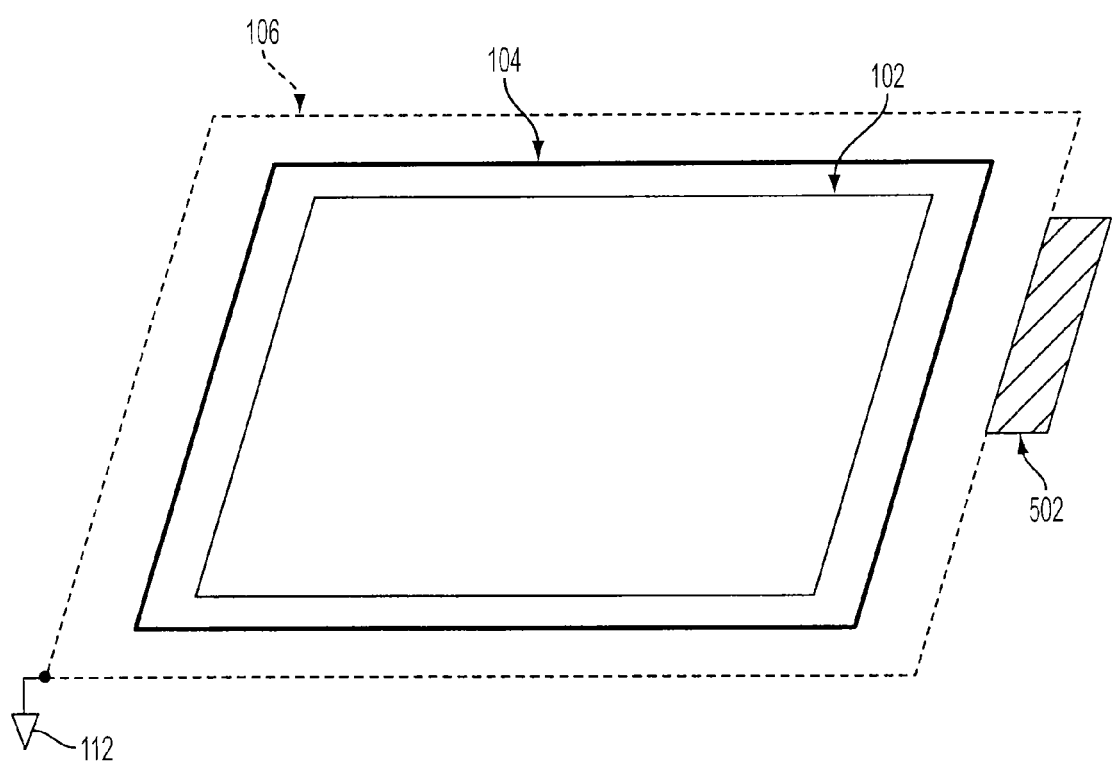
FIG. 5 is a diagram showing the buffer location in relation to the pixel and the active guard ring, in accordance with an embodiment of the invention.

Referring next to FIG. 5, pixel 102 is surrounded by active guard ring 104 and ground guard ring 106. The buffer circuits shown in FIGS. 3 and 4 may be physically placed next to each pixel of the imager array. For example, FIG. 5 shows a buffer circuit that may be constructed next to pixel 102 as shielded element 502, which is located on the right side of pixel 102. The buffer circuit 502 and other buffer circuits may be positioned anywhere around the perimeter of pixel 102. For example, buffer 502 may be disposed on the left, right, top or bottom side of pixel 102.

Since buffer circuit 502 is placed at the perimeter of pixel 102, it may be exposed to impinging electrons. Buffer 502 may be covered by a ground plane that is connected to ground guard ring 106. By covering buffer 502 by a ground plane, the buffer is shielded from impinging electrons. Shielding protects the buffer from impinging electrons because electrons impinging on the ground plane, flow to ground node 112 and not to the transistors comprising the buffer circuit.

In another embodiment, buffer 502 may be disposed underneath pixel 102 (not shown). By configuring buffer 502, in a different layer from the electron imager, the buffer does not use surface area of the imager chip, and therefore, area of each pixel may be maximized. Furthermore, the buffer may not need to be shielded by a ground plane. Shielding may not be necessary because the pixel itself will physically block electrons from impinging on the buffer.

Figure 6:
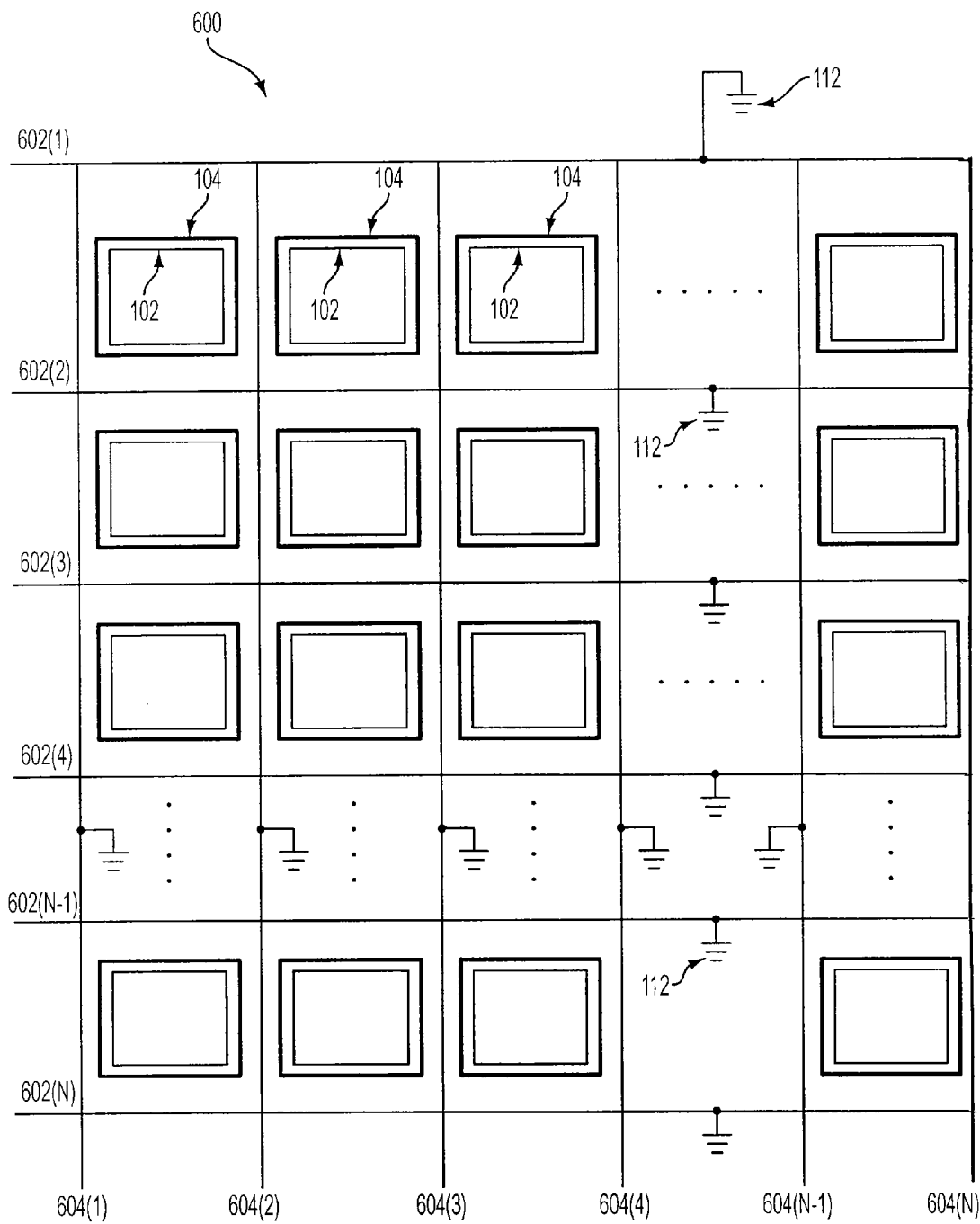
FIG. 6 is a diagram showing an electron imager including an array of pixels each surrounded by the optional ground guard ring in a grid configuration, in accordance with an embodiment of the invention.

Another embodiment of the present invention is shown in FIG. 6. As shown, an electron imager includes various pixels 102 arranged in a array pattern. Also shown is ground guard ring 600 arranged in a grid-like pattern effectively surrounding each pixel of the electron imager. Specifically, ground guard ring 600 includes rows 602(1)-602(N) and columns 604(1)-604(N), each connected to a common ground node 112. Thus, the grid arrangement allows ground guard ring 600 to isolate each individual pixel in the electron imager. As described before, if a voltage potential exists between pixel 102 and active guard ring 104, although a unity gain buffer (not shown) connects the two, a residual leakage may occur. This residual leakage may be conducted through the grid-like structure of ground guard ring 600 to ground node 112. This reduces any leakage charge between adjacent pixels in the imager.

Although this invention is described in reference to an electron imager, it may also be used in a CMOS photon imager. In the CMOS imager, an anode of a photo-diode of a pixel may similarly be coupled to active guard ring 104 via buffer 108. As photons impinge on the CMOS imager during an integration period, charge accumulates on the anode of the photo-diode. This accumulated charge potential is then transferred to active guard ring 104 to provide a near zero potential differential. Thus, the active guard ring configurations illustrated in FIGS. 3 and 4 may be effective in reducing leakage current in CMOS imagers.

The previous embodiments show each pixel in the imager having an individual active guard ring and an individual buffer. In another embodiment, however, a single buffer may control a common active guard ring which is shared by neighboring pixels. The charge potential from one pixel may be able to effectively control charge potential on a common active guard ring shared by neighboring pixels. For example, a center pixel may be surrounded by eight neighboring pixels. Since the charge potential differential between the center pixel and neighboring pixels may not be significantly different due to slow intensity variations within the image, the center pixel may translate its charge potential via a single buffer to a common active guard ring, thereby protecting itself, as well as eight neighboring pixels. In this example, a single buffer may protect a total of nine pixels, thereby, reducing the number of buffers required in the imager.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A pixel leakage reduction circuit comprising:

a pixel for accumulating charge;

an active guard ring surrounding the pixel; and a buffer having an input terminal coupled to the pixel and an output terminal coupled to the active guard ring, wherein the buffer places a charge potential on the active guard ring that is substantially equal to a charge potential on the pixel, effectively reducing charge leakage from the pixel.

2. The pixel leakage reduction circuit of claim 1 wherein the buffer comprises a differential amplifier having a first input terminal coupled to the pixel and a second input terminal coupled to the active guard ring, and the second input terminal of the differential amplifier is coupled to an output terminal of the differential amplifier to provide a unity gain buffer.

3. The pixel leakage reduction circuit of claim 1 wherein the buffer comprises a source follower amplifier having an input terminal coupled to the pixel and an output terminal coupled to the active guard ring, wherein the source follower amplifier provides a unity gain buffer.

4. The pixel leakage reduction circuit of claim 1 comprising a ground guard ring surrounding the active guard ring, wherein the ground guard ring conducts pixel leakage current to a ground node.

5. A pixel leakage reduction circuit for an imager array comprising an array of pixels, each pixel in the array surrounded by an active guard ring, each pixel and active guard ring being coupled to each other by a buffer, wherein each buffer places a charge potential on the active guard ring that is substantially equal to the charge potential on the pixel.

6. The pixel leakage reduction circuit of claim 5 comprising a ground guard ring configured in a grid pattern isolating each pixel and active guard from each other, wherein the ground guard ring conducts a portion of the charge potential to a ground node.

7. The pixel leakage reduction circuit of claim 5 wherein
each buffer for each pixel and active guard ring is disposed adjacent to an end side of each pixel, and
the buffer includes a ground shield for blocking electrons from impinging on the buffer.

8. The pixel leakage reduction circuit of claim 5 wherein
the buffer for each pixel and active guard ring is disposed in a layer below the pixel.

9. The pixel leakage reduction circuit of claim 5 comprising
a ground guard ring surrounding each pixel,
wherein the ground guard ring conducts a portion of the pixel charge potential to a ground node.

10. The pixel leakage reduction circuit of claim 5 comprising
a differential amplifier having a first input terminal coupled to each pixel and a second input terminal coupled to the active guard ring, and
the second input terminal of the differential amplifier is coupled to an output terminal of the differential amplifier to provide a unity gain buffer,
wherein each pixel is a capacitor.

11. The pixel leakage reduction circuit of claim 5 comprising
a source follower amplifier having an input terminal coupled to each pixel and an output terminal coupled to the active guard ring to provide a unity gain buffer,
wherein each pixel is a capacitor.

12. A method of reducing pixel leakage in an array of pixels comprising the steps of:
surrounding a pixel with an active guard ring;
coupling a buffer between the pixel and the active guard ring; and
transferring a charge potential from the pixel to the active guard ring by way of the buffer;
wherein the transferred charge potential is substantially equal to the charge potential on the pixel.

13. The method of claim 12 wherein
transferring includes dynamically transferring the charge potential between the pixel and the active guard ring, in response to a change in the charge potential on the pixel.

14. The method of claim 12 wherein
transferring includes transferring the charge potential using a unity gain buffer.

* * * * *